United States Patent [19]

Siligoni et al.

[11] Patent Number: 4,501,933

[45] Date of Patent: Feb. 26, 1985

[54] TRANSISTOR BRIDGE VOLTAGE RECTIFIER CIRCUIT

[75] Inventors: Marco Siligoni, Vittuone; Nazareno Rossetti, Milan, both of Italy

[73] Assignee: SGS-ATES Componenti Elettronici S.p.A., Milan, Italy

[21] Appl. No.: 393,088

[22] Filed: Jun. 28, 1982

[30] Foreign Application Priority Data

Jun. 30, 1981 [IT] Italy ................................ 22636 A/81

[51] Int. Cl.³ .............................................. H04M 1/74
[52] U.S. Cl. .................................. 179/81 R; 363/127
[58] Field of Search ...................... 179/77, 81 R, 81 A, 179/184; 363/127

[56] References Cited

U.S. PATENT DOCUMENTS 3,434,034  3/1969  Garber et al. ........................ 363/127
4,275,277  6/1981  Ferrieu ......................... 179/81 R X
4,321,430  3/1982  Ferrieu ............................. 179/77 X
4,374,306  2/1983  Lohr .................................. 179/81 R Primary Examiner—G. Z. Rubinson
Assistant Examiner—Keith E. George
Attorney, Agent, or Firm—Wenderoth, Lind & Ponack

[57] ABSTRACT

A transistor bridge rectifier circuit, which is capable of being monolithically integrated, is designed to connect the electronic circuits in a user's telephone set to a two-wire telephone line. The circuit includes a transistor bridge with a "Graetz bridge" circuit arrangement, a current generator, a pair of current mirror circuits connected thereto, which alternately conduct according to the polarity of the line, and a pair of controlled current gain transistors, each controlled by the output of one of the two current mirror circuits. The transistors belonging to the opposite sides of the bridge, the bases of which are respectively connected to the emitter and collector of the same controlled current gain transistor, are biased with the same base current which flows through the controlled current gain transistor.

7 Claims, 3 Drawing Figures

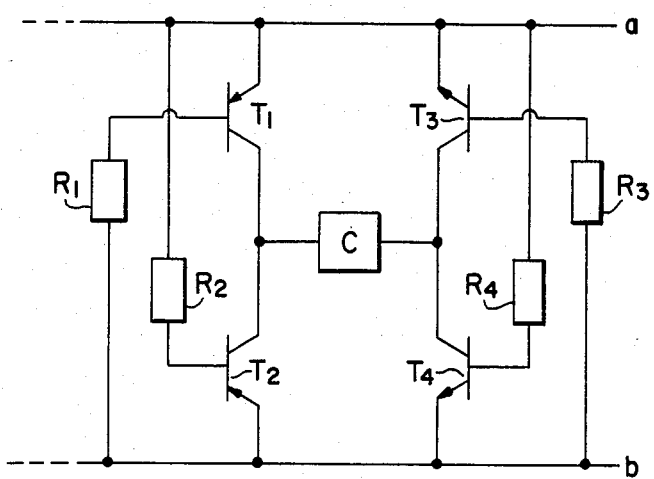
FIG. 1.
PRIOR ART
FIG. 2.
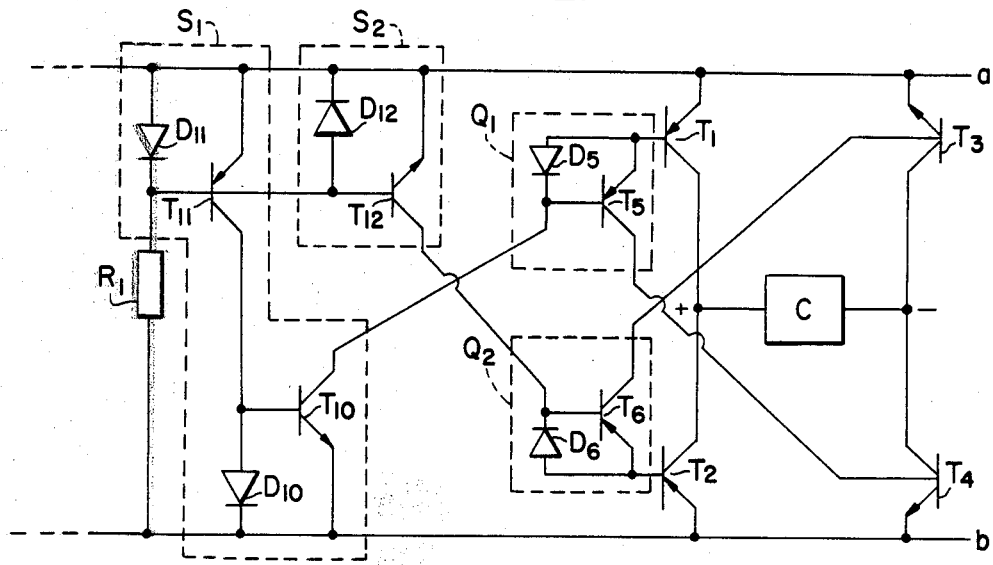
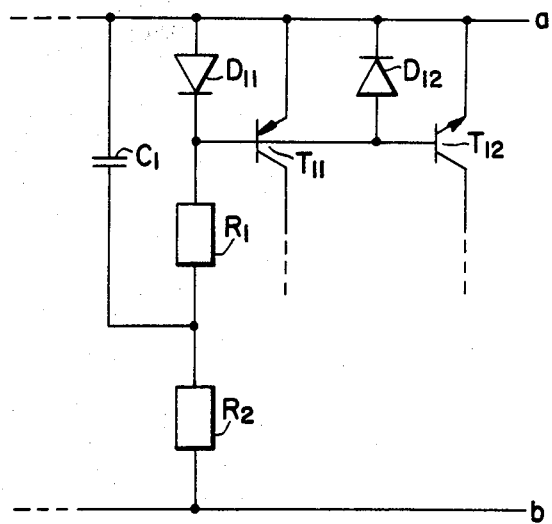
FIG. 3.

TRANSISTOR BRIDGE VOLTAGE RECTIFIER CIRCUIT

SUMMARY OF THE INVENTION

The present invention is related to bridge rectifiers for telephone use. More particularly, the present invention is related to a transistor bridge rectifier, capable of being monolithically integrated, and designed to connect the electronic circuits in a user's telephone set to a low input voltage two-wire telephone line.

The polarity of the voltage present at the terminals of a two-wire telephone transmission line is not exactly predetermined, because accidental polarity inversions may occur during maintenance or repair operations.

On the other hand, it is necessary to apply an input voltage having a predetermined and constant polarity to the terminals of the electronic circuits of telephone sets. Therefore, the electronic circuits must be connected to the two-wire telephone line by means of a circuit capable of rectifying the line voltage when its polarity is inverted relative to the desired polarity.

Rectifier circuits with a "Graetz bridge" circuit arrangement are those most commonly used for this purpose.

A known bridge rectifier, as shown in FIG. 1, is composed of a bridge-like structure comprising first and second PNP type bipolar transistors, designated as $T_1$ and $T_2$, and third and fourth NPN type bipolar transistors, designated as $T_3$ and $T_4$.

The collector of transistor $T_1$ is connected to the collector of transistor $T_2$ and the collector of transistor $T_3$ is connected to the collector of transistor $T_4$, said connections forming first and second terminals, to which the telephone circuit C to be powered is connected.

The emitters of transistors $T_1$ and $T_3$ are connected to wire "a" of a two-wire telephone line; the emitters of transistors $T_2$ and $T_4$ are connected to wire "b" of the same telephone line.

The base of transistor $T_1$ and the base of transistor $T_3$ are connected to wire "b" of the telephone line through resistors $R_1$ and $R_3$, respectively; the base of transistor $T_2$ and the base of transistor $T_4$ are connected to wire "a" of the line through resistors $R_2$ and $R_4$, respectively.

The purpose of the base resistors $R_1$–$R_4$ is to appropriately bias the transistors in the bridge.

With a given polarity in the line, only the PNP type transistor whose emitter is connected to the line terminal with the higher potential and the NPN type transistor whose emitter is connected to the terminal with the lower potential are conducting. The other two transistors of the bridge are inactive.

Therefore, the telephone circuit input current, irrespective of the actual polarity of the line, always flows through the electronic circuit C from the terminal constituting the connection between the collectors of the two PNP type transistors $T_1$ and $T_2$ to the terminal constituting the connection between the collectors of the two NPN type transistors $T_3$ and $T_4$, and the polarity of the voltage between the two terminals is always constant.

A bridge rectifier circuit of the known type described above absorbs a current equal to the sum of the base currents of the two conducting transistors.

The impedance of the base bias circuit of each transistor in the bridge is equal to that of the base resistor of each transistor and is constant.

The impedance of the rectifier circuit as seen from the line, is therefore constant and equal to that of a resistor equivalent to the parallel connection of the base resistors of the two conducting transistors.

Since the load of the bridge transistors consists of an electronic telephone circuit, which has an alternating current impedance which is higher than its direct current resistance, it would be more convenient, as will be more clearly seen from the explanation of the operation of a circuit according to the present invention, to increase the value of the alternating current impedance in the base biasing circuit of the transistors, relative to the direct current resistance.

With the known rectifier circuit, however, this cannot be achieved, even if reactive elements are added to the biasing circuits.

The "voltage loss" of the rectifier circuit, defined as the difference between the voltage at the line terminals and the voltage at the bridge terminals to which the telephone set circuit is connected, is equal, under normal operating conditions, to the sum of the collector-emitter saturation voltages of the two conducting transistors.

The purpose of the present invention is to build a transistor bridge voltage rectifier circuit, capable of being monolithically integrated, and designed to connect the electronic circuits of a user's telephone set to a low input voltage two-wire telephone line, which, with the same voltage loss relative to the known circuits, offers a lower current absorption, and shows a higher impedance to the telephone line and which makes it possible to enable the selection of the ratio between the alternating current impedance and the direct current resistance of the base biasing circuit of the transistors in the bridge, with the addition of a minimum number of reactive components.

BRIEF DESCRIPTION OF THE DRAWINGS

The invention will be better understood from the following detailed description, given purely as an example, and therefore not limiting its scope, with reference to the attached drawings, wherein:

FIG. 1 is a circuit diagram, already described above, of a known transistor bridge circuit arrangement used to power telephone sets;

FIG. 2 is the circuit diagram of a transistor bridge rectifier for telephone use according to the present invention;

FIG. 3 shows a variant of the circuit diagram illustrated in FIG. 2.

DESCRIPTION OF THE PREFERRED EMBODIMENTS

In the various drawings, the same reference letters and numbers are used for the corresponding parts.

The diagram of a rectifier circuit according to the invention, as shown in FIG. 2, comprises a transistor bridge circuit arrangement, consisting of a pair of PNP type bipolar transistors, designated as transistors $T_1$ and $T_2$, and a pair of NPN type bipolar transistors, designated as transistors $T_3$ and $T_4$.

The collector of transistor $T_1$ is connected to the collector of transistor $T_2$ and the collector of transistor $T_3$ is connected to the collector of transistor $T_4$, these connections forming a first terminal, indicated by the + sign, and a second terminal, indicated by the − sign, to which is connected the electronic circuit C of the telephone set to be powered.

The emitters of transistors $T_1$ and $T_3$ are connected to a first wire "a" of the two-wire telephone line and the emitters of transistors $T_2$ and $T_4$ are connected to the second wire "b" of the telephone line.

The base of transistor $T_1$ and the base of transistor $T_4$ are respectively connected to the emitter and the collector of a PNP type bipolar transistor $T_5$. The base of transistor $T_2$ and the base of transistor $T_3$ are respectively connected to the emitter and the collector of a PNP type bipolar transistor $T_6$.

The bases of transistors $T_5$ and $T_6$ are respectively connected to the collector of an NPN type bipolar transistor $T_{10}$ and the collector of an NPN type bipolar transistor $T_{12}$. Furthermore, the base and the emitter of transistor $T_5$ are respectively connected to the cathode and the anode of a diode $D_5$, and the base and the emitter of transistor $T_6$ are respectively connected to the cathode and the anode of a diode $D_6$.

The base and the emmitter of transistor $T_{10}$ are respectively connected to the anode of a diode $D_{10}$ and to wire "b" of the telephone line.

The base and the emitter of transistor $T_{12}$ are respectively connected to the anode of a diode $D_{12}$ and to wire "a" of the telephone line.

The cathodes of diode $D_{10}$ and $D_{12}$ are respectively connected to wire "b" and wire "a" of the telephone line.

The anode of diode $D_{10}$ is also connected to the collector of a PNP type bipolar transistor $T_{11}$. The base and the emitter of transistor $T_{11}$ are respectively connected to the cathode of a diode $D_{11}$ and to wire "a" of the telephone line.

The anode and the cathode of diode $D_{11}$ are respectively connected to wire "a" of the telephone line and to a first terminal of a resistor $R_1$. The anode of diode $D_{12}$ is also connected to the first terminal of resistor $R_1$. The second terminal of resistor $R_1$ is directly connected to wire "b" of the telephone line.

FIG. 3 shows a variant of the part of the circuit diagram shown in FIG. 2 comprising PNP type transistor $T_{11}$ and NPN type transistor $T_{12}$ and diodes $D_{11}$ and $D_{12}$.

FIG. 3 does not show the part of the rectifier circuit connected to the collectors of transistors $T_{11}$ and $T_{12}$, since said part is identical to that shown in FIG. 2.

The base and the emitter of transistor $T_{11}$ are respectively connected to the cathode of diode $D_{11}$ and to wire "a" of the telephone line. The base and the emitter of transistor $T_{12}$ are respectively connected to the node of diode $D_{12}$ and to wire "a" of the telephone line.

The cathode of diode $D_{11}$ and the anode of diode $D_{12}$ are also connected to a first terminal of a resistor $R_1$, the second terminal of which is connected to a first terminal of a resistor $R_2$. The second terminal of resistor $R_2$ is connected to wire "b" of the telephone line. A capacitor $C_1$ is inserted between the point of connection of the second terminal of resistor $R_1$ to the first terminal of resistor $R_2$ and wire "a" of the telephone line.

In the absence of a signal on the line, a constant voltage, equal to the difference between the line voltage and the junction voltage of a diode ($D_{11}$ or $D_{12}$), is applied to the terminals of resistor $R_1$ (or of the resistor equivalent to resistors $R_1$ and $R_2$ in series, in the case of the circuit variant shown in FIG. 3, which also includes capacitor $C_1$).

Therefore, according to Ohm's law, a current of constant value, the direction of which is determined by the polarity of the line, flows through resistor $R_1$ (or resistors $R_1$ and $R_2$ in the second case).

Diodes $D_{10}$ and $D_{11}$, transistors $T_{10}$ and $T_{11}$ and their connections constitute a first current mirror circuit, the first current mirror circuit being surrounded in FIG. 2 by a dotted line and designated by the symbol $S_1$; similarly, diode $D_{12}$, transistor $T_{12}$ and their connections constitute a second current mirror circuit, designated by the symbol $S_2$.

Transistor $T_5$, together with diode $D_5$ connected to it, constitutes a first structure of the type usually referred to as "controlled current gain ($\beta$) PNP type bipolar transistor", which is surrounded in FIG. 2 by a dotted line and is designated by the symbol $Q_1$; transistor $T_6$, together with diode $D_6$, connected to it, constitutes a second controlled current gain PNP type bipolar transistor, designated by the symbol $Q_2$.

As is well known, in the case of a controlled current gain bipolar transistor thus formed, it is still possible to indicate a "base", an "emitter", a "collector", and a certain type of conductivity, at the base, the emitter, the collector, according to the type of conductivity of the bipolar transistor contained within its structure.

The input branch of current mirror circuit $S_1$ and the input branch of current mirror circuit $S_2$ are connected to the first terminal of resistor $R_1$, the output branches of $S_1$ and $S_2$ are respectively connected to the base of $Q_1$ and the base of $Q_2$.

The input current of current mirror circuits $S_1$ and $S_2$ is mirrored at the output, with a certain current transfer factor, to respectively control $Q_1$ and $Q_2$, at the bases thereof.

When wire "a" of the telephone line has an electrical potential which is higher than that of wire "b", transistors $T_1$, $T_4$, $T_5$, $T_{10}$, $T_{11}$ and diodes $D_5$, $D_{10}$, and $D_{11}$ are conducting, whereas transistors $T_2$, $T_3$, $T_6$, $T_{12}$ and diodes $D_6$ and $D_{12}$ are non-conducting; the opposite occurs when wire "a" of the telephone line has an electrical potential which is lower than that of wire "b", that is, when the polarity of the line is inverted with respect to the previous case.

Therefore, when wire "a" of the telephone line has a higher potential, only current mirror circuit $S_1$, controlled $\beta$ transistor $Q_1$, operated by $S_1$, and transistors $T_1$ and $T_4$, controlled at their bases by $Q_1$, are active. When wire "b" of the telephone line has a higher potential, only current mirror circuit $S_2$, controlled $\beta$ transistor $Q_2$, operated by $S_2$, and transistors $T_2$ and $T_3$ controlled at their bases by $Q_1$, are active.

In the first case, the input current flows through the telephone circuit C from transistor $T_1$ to transistor $T_4$; in the second case, the input current flows through C from transistor $T_2$ to transistor $T_3$.

Thus, the input power always flows through the telephone circuit in the same direction, from terminal "+" in the bridge to terminal "−", irrespective of the polarity of the telephone line.

The parameters of the rectifier circuit are arranged so that the transistors in the bridge operate in the saturation zone when they are conducting.

The useful voltage loss of a circuit according to this invention is optimally minimum for a transistor bridge circuit. That is, the voltage loss is equal to the sum of the collector-emitter voltages, under saturation conditions, of the two transistors in the bridge circuit that are conducting.

A rectifier circuit according to this invention shows a current absorption which is approximately halved relative to the bridge circuit of the known prior art type. Actually, the output base biasing current of the conducting PNP type transistor in the bridge, depending on the polarity of the line, is reused, through the controlled current gain transistor connected to it, as an input base biasing current of the corresponding NPN type conducting transistor (except for the negligible base current of the controlled $\beta$ transistor).

Thus, the current absorption is equal to the value of the base current of a PNP type transistor.

As already stated above, the bridge transistors are so biased that they operate in the saturation zone, for the purpose of reducing the voltage loss to the minimum value possible with a transistor bridge.

The saturation current gain of a transistor, $\beta_{sat}$, is an inherent parameter of said transistor and its value is equal to the ratio of the collector current, $I_{c\ sat}$, to the base current, $I_{B\ sat}$.

For each transistor in the bridge, neglecting small voltage drops, such as the collector-emitter saturation voltage and the base-emitter saturation voltage, it is possible to approximately calculate:

$$I_{B\ sat} = V/Z_B \text{ and } I_{C\ sat} = V/Z_L$$

where V is the line voltage and $Z_B$ and $Z_L$ are respectively the impedance of the base biasing circuit of the transistor and the impedance of the load consisting of the telephone circuit connected to the bridge terminals.

Therefore, the biasing condition for the saturation of the transistor is:

$$Z_B = \beta_{sat} Z_L$$

The impedance of the rectifier circuit, as seen from the terminals of the telephone line, is mainly determined by the impedance $Z_B$ of the base biasing circuits of the bridge transistors.

Since the $Z_B$ impedance related to each individual transistor in the bridge is equal to that of the base resistor of said transistor, the impedance that the known rectifier circuit, as described above, presents to the line can be calculated, neglecting the internal resistances and capacities of the transistors, as follows:

$$Z = (R_1 \cdot R_4)/(R_1 + R_4) = (R_2 \cdot R_3)/(R_2 + R_3)$$

Therefore, the impedance of the prior art known rectifier circuit is lower (by a factor of approximately two) than the base impedance $Z_B$.

On the other hand, the impedance of a rectifier circuit according to the present invention, as seen from the line, is approximately equal to the impedance of the base biasing circuit of an individual bridge transistor, because the biasing circuit is common to each pair of simultaneously conducting transistors, since, as we have seen, they are both operated by the same current, which flows through the controlled current gain transistor connected to them.

Therefore, the load and the transistors used being equal, the circuit according to the present invention has an impedance, as seen from the line, which is approximately double that of the known prior art circuit.

The impedance of a load consisting of an electronic telephone circuit, with respect to an alternating current, has a higher value than that with respect to a direct current (for example, six times higher); the impedance of the base biasing circuit of the bridge transistors, to which said load is connected, on the other hand, has a constant value if no reactive elements are contained within said circuit.

Since the biasing condition for saturation:

$$Z_B = \beta_{sat} Z_L$$

cannot be fulfilled, operation with alternating current is negatively affected.

In order to fulfill the biasing condition for saturation both with direct current and with alternating current, it is possible to add to the basic circuit of this invention, as shown in FIG. 3, an appropriate capacitor $C_1$, as well as replacing the single resistor $R_1$ by an equivalent pair of resistors in series, namely, resistors $R_1$ and $R_2$.

In contrast with that of the known prior art type circuit, the circuit arrangement according to the present invention, containing a current mirror structure in the base biasing circuit of the bridge transistors for amplifying the current operating said transistors, indeed makes it possible, by means of such a simple circuit variant, to increase the value of the impedance of the biasing circuit when used with alternating current, relative to that when used with direct current.

The reason is that, with alternating current, the input current of mirrors $S_1$ and $S_2$, which is amplified by them to control the bridge transistors at their bases through $Q_1$ and $Q_2$, is only a part of the total input current with alternating current, because a current also flows through capacitor $C_1$, connected in parallel to the input branch of the mirrors. Therefore, the current operating the bridge transistors is lower with alternating current and the impedance of the biasing circuit appears to be higher than with direct current.

Resistor $R_1$ or the pair of resistors $R_1$ and $R_2$ and capacitor $C_1$ must have impedance values with small tolerances, and therefore are generally not monolithically-integrated with the rest of the circuit, because in monolithic integrated circuits, their tolerances relative to the nominal values might be as high as 30%.

On the other hand, in comparison with integrated circuit components, discrete components, together with their connections, are much more expensive.

Therefore, the economic advantage offered by the simplicity of the variant shown in FIG. 3 is also obvious.

A rectifier circuit according to the present invention is particularly suitable to be integrated into a monolithic semiconductor chip by means of the known integration techniques.

As already stated above, it may be convenient not to apply the integration to the resistors and the capacitor of the biasing circuit, in order to keep the rating tolerances of those devices within narrower margins.

Although only one embodiment of the invention has been illustrated and described, it is obvious that numerous variants are possible, without falling outside the scope of said invention.

For example, the two simple current mirror circuits might be replaced, with appropriate circuit modifications of which an expert in this field would be capable, by more complex current mirror circuits, having a circuit arrangement suitable, for example, to make the rectifier circuit insensitive to temperature changes; or to replace each transistor in the bridge (both the NPN type and the PNP type) by several transistors connected in series.

We claim:

1. A transistor bridge voltage rectifier circuit for connecting an electronic circuit of a telephone set to a two-wire telephone line, said circuit comprising first and second bipolar transistors having a first type of conductivity, and third and fourth bipolar transistors having a second type of conductivity which is opposite to that of the first type of conductivity, the collector of said first transistor being connected to the collector of said second transistor and the collector of said third transistor being connected to the collector of said fourth transistor, said connections respectively forming first and second terminals to which said electronic circuit of said telephone set is connected, the emitters of said first and the third transistors being connected to a first wire of said telephone line, the emitters of said second and of the fourth transistors being connected to a second wire of said telephone line;

said rectifier circuit further comprising a biasing circuit which comprises:

first and second controlled current gain bipolar transistors having a conductivity of said first type, the emitter and the collector of said first controlled current gain transistor being respectively connected to the base of said first transistor and to the base of said fourth transistor, the emitter and the collector of said second controlled current gain transistor being respectively connected to the base of said second transistor and the base of said third transistor; and, a control circuit for controlling said first and second controlled current gain transistors, said control circuit being sensitive to the polarity of the telephone line voltage and connected to the base of said first controlled current gain transistor and the base of said second controlled current gain transistor.

2. A circuit according to claim 1, wherein said control circuit comprises:

a current generator circuit and first and second current mirror circuits;

said first current mirror circuit comprising fifth and sixth bipolar transistors which are respectively of said second and first type of conductivity, and first and second diodes, the collector of said fifth transistor being connected to the base of said first controlled current gain transistor, the cathode of said first diode and the emitter of said fifth transistor being connected to said second wire of said telephone line, the anode of said first diode being connected to the base of said fifth transistor and to the collector of said sixth transistor, the anode of said second diode and the emitter of said sixth transistor being connected to said first wire of said telephone line, the cathode of said second diode being connected to the base of said sixth transistor and to said current generator circuit;

said second current mirror circuit comprising a seventh bipolar transistor of said second type of conductivity and a third diode, the collector of said seventh transistor being connected to the base of said second controlled current gain transistor, the cathode of said third diode and the emitter of said seventh transistor being connected to said first wire of said telephone line, the anode of said third diode being connected to the base of said seventh transistor and to said current generator circuit.

3. A circuit according to claim 2, wherein said current generator circuit comprises a resistor having first and second terminals, said first terminal being connected to the cathode of said second diode and to the anode of said third diode, the second terminal being connected to the second wire of said telephone line.

4. A circuit according to claim 2, wherein said current generator circuit comprises:

first and second resistors, each having first and second terminals, said first terminal of said first resistor being connected to the cathode of said second diode and to the anode of said third diode, said first and second terminals of said second resistor being respectively connected to said second terminal of said first resistor and to said second wire of said telephone line;

and further comprises a capacitor inserted between said first wire of said telephone line and the connection point between said second terminal of said first resistor and said first terminal of said second resistor.

5. A circuit according to any one of claims 1 through 4, wherein said entire circuit is integrated in a monolithic semiconductor chip.

6. A circuit according to claim 3, wherein said entire circuit, with the exception of said resistor of said current generator circuit is integrated in a monolithic semiconductor chip and said resistor of said current generator circuit comprises a discrete component connected to said monolithic semiconductor chip.

7. A circuit according to claim 4, wherein said entire circuit, with the exception of said capacitor and said first and second resistors, is integrated in a monolithic semiconductor chip, and said capacitor and said first and second resistors comprise discrete components connected to said monolithic semiconductor chip.

* * * * *